(12) United States Patent
Mattson et al.

(10) Patent No.: US 9,578,028 B2
(45) Date of Patent: Feb. 21, 2017

(54) SUBSCRIBER MANAGEMENT USING A RESTFUL INTERFACE

(71) Applicant: Juniper Networks, Inc., Sunnyvale, CA (US)

(72) Inventors: Geoffrey A. Mattson, Palo Alto, CA (US); Lei Qiu, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 137 days.

(21) Appl. No.: 14/318,515

(22) Filed: Jun. 27, 2014

(65) Prior Publication Data

US 2015/0381623 A1 Dec. 31, 2015

(51) Int. Cl.
  H04L 29/06 (2006.01)
  H04L 29/08 (2006.01)
  H04L 12/911 (2013.01)
  H04L 12/24 (2006.01)

(52) U.S. Cl.
  CPC ......... H04L 63/0892 (2013.01); H04L 47/783 (2013.01); H04L 63/20 (2013.01); H04L 67/02 (2013.01); H04L 41/5003 (2013.01); H04L 63/102 (2013.01)

(58) Field of Classification Search
  CPC .... H04L 47/783; H04L 63/0892; H04L 63/20; H04L 67/02; H04L 63/102; H04L 41/5003
  USPC .......................................................... 726/4
  See application file for complete search history.

(56) References Cited

U.S. PATENT DOCUMENTS 6,097,793 A * 8/2000 Jandel ................ H04L 12/5692
  379/201.01
8,700,801 B2 4/2014 Medved et al.
2008/0253322 A1* 10/2008 So ......................... H04L 12/189
  370/329
2009/0328205 A1 12/2009 Ims et al.
2012/0281540 A1* 11/2012 Khan ................... H04L 45/308
  370/241
2013/0128883 A1 5/2013 Lawson et al.
(Continued)

FOREIGN PATENT DOCUMENTS

WO 2013184846 A 12/2013

OTHER PUBLICATIONS

Search Report from counterpart European Application No. 15174108.9, dated Nov. 17, 2015, 5 pp.
(Continued)

Primary Examiner — Kambiz Zand
Assistant Examiner — Benjamin Kaplan
(74) Attorney, Agent, or Firm — Shumaker & Sieffert, P.A.

(57) ABSTRACT

A controller provides authentication, authorization, and accounting (AAA) services for a network, the controller comprising a control unit having one or more processors and a Representational State Transfer (REST) interface executed by the control unit to receive application data that specifies an interface method and a resource identifier for a resource, the resource identifier conforming to a subscriber management resource model. The REST interface determines, based on the resource identifier, a record for a subscriber management construct corresponding to the resource. The REST interface applies, to the record, an action corresponding to the interface method to modify access to the network by a subscriber.

24 Claims, 4 Drawing Sheets

(56) References Cited

U.S. PATENT DOCUMENTS

| | | | |
|---|---|---|---|
| 2013/0167199 A1 | 6/2013 | Said et al. | |
| 2013/0204849 A1* | 8/2013 | Chacko | G06F 3/0604 |
| | | | 707/692 |
| 2013/0250770 A1 | 9/2013 | Zou et al. | |
| 2015/0103647 A1* | 4/2015 | Batz | H04W 28/0215 |
| | | | 370/230 |

OTHER PUBLICATIONS

"JunosE™ Software for E Series™ Broadband Services Routers: Broadband Access Configuration Guide," Juniper Networks, release 14.1.x, Dec. 16, 2012, 814 pp.

"Policy and Charging Control (PCC), Reference Points (Release 11)," 3GPP TS 29.212—Version 11.7.0, 3rd Generation Partnership Project, Technical Specification Group Core Network and Terminals, Dec. 2012, 196 pp.

"Policy and Charging Control Architecture (Release 10)," 3GPP TS 23.203—Version 10.1.0, 3rd Generation Partnership Project, Technical Specification Group Services and System Aspects, Sep. 2010, 131 pp.

Atlas et al., "Interface to the Routing System Framework: draft-ward-irs-framework-00," Network Working Group, Internet-draft, Jul. 30, 2012, 22 pp.

Fajardo et al., "Diameter Base Protocol," Internet Engineering Task Force (IETF), Request for Comments 6733, Oct. 2012, 153 pp.

Rigney et al., "Remote Authentication Dial in User Service (RADIUS)," Network Working Group of the Internet Engineering Task Force (IETF), Request for Comments 2865, Jun. 2000, 76 pp.

Vasseur et al., "Path Computation Element (PCE) Communication Protocol (PCEP)," Network Working Group, Request for Comments 5440, Mar. 2009, 88 pp.

U.S. Appl. No. 13/324,861, by Jan Medved et al., filed Dec. 13, 2011.

Bueno et al., "An OpenNaas Based SDN Framework for Dynamic QoS Control," IEEE SDN for Future Networks and Services, Nov. 2013, pp. 1-7.

Chase et al., "Joint Virtual Machine and Bandwidth Allocation in Software Defined Network (SDN) and Cloud Computing Environments," IEEE International Conference on Communications (ICC), Jun. 10-14, 2014, pp. 2969-2974.

Zhu et al., "Reliable Resource Allocation for Optically Interconnected Distributed Clouds," IEEE International Conference on Communications (ICC), Jun. 10-14, 2014, pp. 3301-3306.

* cited by examiner

SUBSCRIBER MANAGEMENT USING A RESTFUL INTERFACE

TECHNICAL FIELD

The invention relates to computer networks and, more specifically, to subscriber authentication, authorization, and accounting within computer networks.

BACKGROUND

Network service providers typically deploy one or more servers to manage authentication, authorization, and accounting (AAA) functionality for networks that offer services to one or more subscribers. The protocol most commonly used by the servers to communicate with clients is the Remote Authentication Dial-In User Service (RADIUS) protocol. The RADIUS protocol is described in Carl Rigney et al., "Remote Authentication Dial In User Server (RADIUS)," Network Working Group of the Internet Engineering Task Force (IETF), Request for Comments 2865, June 2000, which is incorporated by reference herein in its entirety (referred to hereinafter as "RFC 2865"). Another AAA framework, known as the Diameter protocol, extends and replaces RADIUS. Diameter is described in V. Fajardo et al., "Diameter Base Protocol," Network Working Group of the Internet Engineering Task Force (IETF), Request for Comments 6733, October 2012, which is incorporated by reference herein in its entirety (referred to hereinafter as "RFC 6733"). The RADIUS, Diameter, and other AAA protocols are referred to hereinafter using the term, "AAA protocol," which provides a "AAA framework" for applications.

To request access to a service, a subscriber connects to a network access server (NAS) that acts as a gateway to the service as provided by a service provider network (or the Internet, e.g.). If the NAS is a AAA client configured to communicate with a AAA server for the service provider network using the AAA protocol, the NAS confirms that the subscriber is authentic and is authorized to access the service by requesting the AAA server to validate the access request from the subscriber. Upon validating an access request, the AAA server responds to the NAS with a AAA protocol message directing the NAS to accept the access request and establish a session enabling connectivity between the subscriber and the service provider network for the requested service.

SUMMARY

In general, techniques are described for exposing a RESTful interface to a AAA framework for a network to adapt existing subscriber management and service management infrastructure to the RESTful software architecture style. A RESTful interface (or more simply, a "REST interface") refers to an interface that conforms to the REpresentational State Transfer (REST) software architectural style, which involves a stateless client-server architecture in which the client interacts with the server by way of services, identified using resource Uniform Resource Identifiers (URIs), to perform actions with respect to the identified resources.

In some examples of the techniques, a controller exposes a RESTful interface that maps resource URIs to subscriber management-related constructs managed by a AAA or other policy server. The constructs may include subscriber profiles (including authorized services), services provided by the network, and service-level agreement (SLA) profiles, for example. Put another way, the RESTful interface organizes the resource URIs according to a subscriber management resource model, which the controller may translate to the legacy AAA data model and use to manage subscribers, by way of the AAA protocol. Applications, network operators, controllers, or other entities may invoke a method of the RESTful interface of the controller using a communication protocol for transferring application data that specifies the method, a resource URI, and optionally parameters for the method. The controller translates the resource URI and the optional parameters to subscriber-management related constructs and applies, to the corresponding resource(s), one of a create, read, update, and delete (CRUD) action corresponding to the method specified by the application data.

The techniques may provide one or more advantages. For example, providing a RESTful interface to the AAA framework may enable the network operator to flexibly and responsively perform subscriber management for the network. The network operator may, as a result, embed subscriber management into a software-defined networking (SDN) workflow without having to modify at least some of the legacy network infrastructure. For example, network access servers (NASes) acting as gateways to the provided services for the subscriber may continue to operate according to the AAA framework using, e.g., RADIUS/Diameter. In other words, the techniques may permit RESTful access to RADIUS/Diameter-controller NASes or other network infrastructure. Because the network operator does not need to upgrade or replace the NASes in order to realize the benefits of an SDN workflow with respect to subscriber management, the techniques may potentially reduce operational expenditures (OpEx) to the operator going forward while holding down capital expenditures (CapEx).

In one example, a method comprises receiving, by a controller for a network and via a Representational State Transfer (REST) interface, application data that specifies an interface method and a resource identifier for a resource, the resource identifier conforming to a subscriber management resource model. The method also comprises determining, by the controller and based on the resource identifier, a record for a subscriber management construct corresponding to the resource. The method also comprises applying, by the controller to the record, an action corresponding to the interface method to modify access to the network by a subscriber.

In another example, a controller provides authentication, authorization, and accounting (AAA) services for a network, the controller comprising a control unit having one or more processors and a Representational State Transfer (REST) interface executed by the control unit to receive application data that specifies an interface method and a resource identifier for a resource, the resource identifier conforming to a subscriber management resource model. The REST interface determines, based on the resource identifier, a record for a subscriber management construct corresponding to the resource. The REST interface applies, to the record, an action corresponding to the interface method to modify access to the network by a subscriber.

In another example, a non-transitory computer-readable medium contains instructions. The instructions cause one or more programmable processors to receive, by a controller for a network and via a Representational State Transfer (REST) interface, application data that specifies a interface method and a resource identifier for a resource, the resource identifier conforming to a subscriber management resource model; determine, by the controller and based on the resource identifier, a record for a subscriber management construct corresponding to the resource; and apply, by the controller to the record, an action corresponding to the interface method to modify access to the network by a subscriber.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
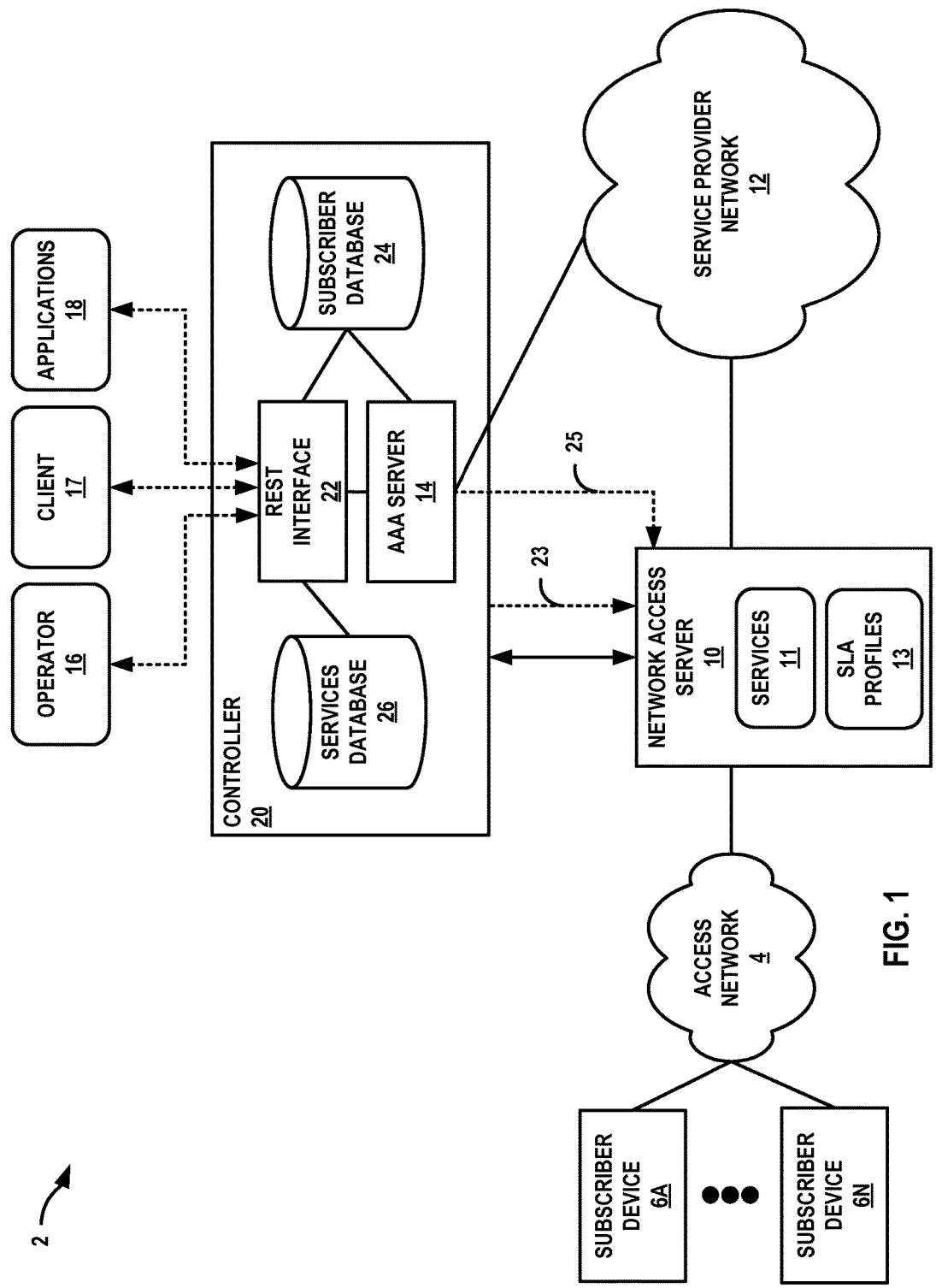
FIG. 1 is a block diagram illustrating a network system having a controller that presents a RESTful interface for subscriber and service management according to techniques described in this disclosure.

FIG. 1 is a block diagram illustrating a network system having a controller that presents a RESTful interface for subscriber and service management according to techniques described in this disclosure. In this example, network system 2 includes service provider (SP) network 12 coupled to access network 4 via network access server (NAS) 10. Although described with respect to a service provider operating a service provider network 12, SP network 12 may in some examples represent an enterprise network managed by a large enterprise. In addition, although described with respect to "subscribers" that connote end-users of a service provider network services, the techniques described herein are similarly applicable to "customers" (alternatively, "clients") of the service provider and to customer devices such as cell towers, multi-tenant units (MTUs), residential aggregation points, and so forth. Examples of customers may include universities, businesses, or any other entities that purchase, lease, or otherwise use services provided by service provider network 12.

Service provider network 12 supports one or more packet-based services that are available for request and use by subscriber devices 6A-6N (collectively, "subscriber devices 6"). As examples, SP network 12 may provide Internet access, bulk data delivery, voice over Internet protocol (VoIP), Internet Protocol television (IPTV), Short Messaging Service (SMS), Wireless Application Protocol (WAP) service, Telnet, or customer-specific application services. Service provider network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by a network service provider that also operates access network 4, an enterprise IP network, or some combination thereof. In various embodiments, SP network 12 may be connected to a public WAN, the Internet, or to other networks. SP network 12 executes one or more packet data protocols (PDPs), such as IP (IPv4 and/or IPv6), X.25 or Point-to-Point Protocol (PPP), to enable packet-based transport of SP network 12 services.

An administrator/operator of SP network 12 (a network service provider or enterprise) deploys network access server (NAS) 10 to function as an access gateway to the service provided by service provider network 12. Accordingly, NAS 10 represents a device or component (e.g., board or service card) within a device that governs access to SP network 12 to subscriber devices 6. For example, NAS 10 may represent and/or incorporate a network access server that provides dial-up or virtual private network (VPN) services to an enterprise LAN. NAS 10 may also or alternatively represent a remote access server (e.g., Broadband Remote Access Server (BRAS)), Broadband Services Router (BSR), or Broadband Network Gateway (BNG), that aggregates outputs from one or more Digital Subscriber Line Access Multiplexers (DSLAMs) or Cable Modem Termination Systems into a higher-speed uplink to SP network 12, a wireless access point (WAP) providing wireless physical layer access to SP network 12, a Remote Access Server, a Virtual Private Network server, a switch with port-based authentication, or another device that governs access to SP network 12.

Subscriber devices 6 connect to NAS 10 via access network 4 to receive connectivity to SP network 12 services for applications hosted by subscriber devices 10. Each of subscriber devices 6 may represent, for example, a workstation, desktop computer, laptop computer, cellular or other mobile device, Personal Digital Assistant (PDA), gaming console, television set-top box, smart phone, tablet computer, or any other device capable of accessing a computer network via a wireless and/or wired connection. Each of subscriber devices 6 may be associated with a subscriber (e.g., a human). Subscriber devices 6 may in some cases include and be referred to as customer premise equipment (CPE).

A network service provider (or other entity that administers SP network 12) operates or in some cases leases elements of access network 4 to provide packet transport between subscriber devices 6 and NAS 10. Access network 4 may include a broadband access network (e.g., cable or Digital Subscriber Line (DSL)), cellular access network, wireless LAN, public switched telephone network (PSTN), or other type of access network. In examples of network system 2 that include a cellular access network as access network 4, NAS 10 may represent a mobile gateway, for example, a Gateway General Packet Radio Service (GPRS) Serving Node (GGSN), an Access Gateway (aGW), or a Packet Data Network (PDN) Gateway (PGW).

The elements of access network 4 may support any one or more of a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Using any one or more of these protocols, any of subscriber devices 6 may present authentication credentials to NAS 10 to request access to a SP network 12 service. For example, subscriber device 10A may send credentials, such as a username and password, to NAS 10 to request access to a service provided by SP network 12. Subscriber devices 6 may send credentials using, for instance, a PPPoE Active Discovery Initiation (PADI) packet to NAS 10.

NAS 10 establishes subscriber sessions for authorized subscribers 6 to enable connectivity to SP network 12 for one or more services defined for NAS 10. Services 11 represent service definitions that each defines a single service, which is usable for instantiation as a service for multiple subscriber devices 6. Services 11 define the capabilities and characteristics of services provided by service provider network via NAS 10, said capabilities and characteristics including, for instance, interface profiles; policy lists; classifier lists; and service-level agreement (SLA) profiles that may include Quality of Service (QoS) parameters, QoS profiles, and rate-limit profiles such as bandwidth attributes for the service. In some cases, services 11 may be parameterized such that NAS 10 may instantiate a service for multiple subscribers by providing different parameter values configured for the subscribers. Examples of services 11 may include a VoIP service definition, VoD service definition, walled garden service definition, mobile service definition, and broadband Internet service definition.

NAS 10 may create a service instance for a subscriber by specifying one of SLA profiles 13 and/or parameter values, if needed, for a service definition to create a service session, i.e., a session created when NAS 10 activates a service instance for one of subscriber devices 6. Each of subscriber devices 6 may be associated with multiple active service sessions in parallel. NAS 10 may store a session context for each session that includes session context information, such as the IP address allocated to the subscriber, the Access Point Name (APN) for the service, a Network Service Access Point Identifier (NSAPI) for the service session, forwarding information, charging information for accounting records, one or more quality of service (QoS) profiles for the subscriber, and/or a subscriber IMSI or other mobile subscriber identity. A network operator may use a command-line (CLI) or other interface to configure services 11 available for instantiation and use by subscriber devices, as well as to configure SLA profiles 13. In some examples, controller 20 configures one or more of services 11 and SLA profiles 13 to facilitate a software-defined networking (SDN) workflow. Additional information regarding software-defined networking is found in PCT International Patent Application PCT/US13/44378, filed Jun. 5, 2013, the entire contents of which are incorporated herein by reference. Additional information regarding configuring services is found in U.S. patent application Ser. No. 14/318,541, "GRAPH DATABASE FOR SERVICES PLANNING AND CONFIGURATION IN NETWORK SERVICES DOMAIN," Geoffrey Mattson & Lei Qiu, filed Jun. 27, 2014, which is incorporated by reference as is fully set forth herein.

Controller 20 provides a high-level controller for configuring and managing routing and switching infrastructure of service provider network 12 (including, e.g., NAS 10). Controller 20 may represent a SDN controller in some examples. Controller 20 may be logically and/or physically centralized and may represent or be hosted by a dedicated appliance, one or more servers, or another network device.

Controller 20 includes a AAA server 14 for centrally managing subscriber sessions, and NAS 10 is configured by the network service provider (or other administrative entity) as an authentication, authorization, and accounting (AAA) client to outsource AAA functions to AAA server 14. In part by using AAA server 14, controller 20 performs subscriber management functionality including authentication, authorization, accounting, dynamic policy management, policy routing, dynamic service authorization, for instance. Authentication is the process of verifying a subscriber identity. Authorization is the process of determining whether and the form in which an authenticated subscriber has access to SP network 12, e.g., for which of services 11 is the authenticated subscriber authorized and in what manner. Accounting is the process of generating records of session statistics for subscribers for billing and monitoring.

Controller 20 includes a subscriber database 24 that stores a list of subscriber accounts and subscriber account properties that can be checked by AAA server 14 to verify authentication credentials and queried by AAA server 14 to obtain subscriber account properties containing authorization and connection parameter information for subscribers. Subscriber database 24 may in some examples include policy routing filters (hereinafter, "data filters") that may be associated with subscribers to determine packet routing and forwarding for the subscribers according to policies determined by the network operator 16, client 17, and/or applications 18. Subscriber database 24 may include an RSA SecurID system, a Structured Query Language or Lightweight Directory Access Protocol (LDAP) database server, or a Home Location Register, for instance. In some examples, subscriber database 24 may be external to the controller 20 but accessible by way of a communication protocol. For example, subscriber database 24 may be presented by an external database server. In some examples, AAA server 14 may outsource some AAA functionality to one or more backend servers, such as an authentication server, external database, and remote AAA server (not illustrated).

AAA server 14 stores (to subscriber database 24, for example) session information in session records for service sessions established by NAS 10. Session records include information received from NAS 10 in AAA request messages, such as RADIUS Accounting-Request and/or Access-Request messages. For example, a session record for a session established by NAS 10 may include a subscriber user name, a (NAS-ID)entifier value for that uniquely identifies NAS 10 to RADIUS server 14, a NAS 10 network address (e.g., an IPv4 or IPv6 address), an accounting session identifier that uniquely identifies the session on NAS 10 (e.g., "Acct-Session-Id" described in RFC 2866), and accounting information (e.g., input or output octets/packets for the session, timing information).

When NAS 10 receives authentication credentials from a subscriber in a request to access SP network 12 services, NAS 10 sends a request that conforms to the AAA protocol for the AAA server 14. For example, NAS 10 may send a RADIUS protocol Access-Request to AAA server 14 containing attributes such as the subscriber user name and password, an identifier for the NAS 10 (e.g., the "NAS-ID"), the NAS 10 network address, and the Port ID the subscriber is accessing. If subscriber database 24 stores a configuration record for the subscriber and the authorization credentials are correct, AAA server 14 returns a RADIUS protocol Access-Accept message to the NAS 10. If a match is not found or a problem is found with the authentication credentials, the server returns a RADIUS Access-Reject message. The NAS 10 then establishes or terminates the user's connection accordingly. The NAS 10 may then forward accounting information to AAA server 14 to document the transaction, which the AAA server 14 may store or forward this information to support billing for the services provided. Although this example accords with the RADIUS protocol, Diameter and other AAA protocols operate similarly.

In accordance with techniques described herein, controller 20 exposes a REST interface 22 to enable network operator 16, client 17, and/or applications 18 to manage the access to service provider network 12 by subscriber devices 6 in a RESTful manner. REST interface 22 is a RESTful interface in that REST interface 22 conforms to the REpresentational State Transfer (REST) software architectural style, which involves a stateless client-server architecture in which operator 16, client 17, and/or applications 18 exchange application data with controller 20 to access resources and to perform actions with respect to the identified resources.

REST interface 22 may provide different levels of access each requiring authentication. REST interface 22 may employ traditional username and password authentication, OAuth 2.0 based user authentication, or another type of authentication. Operator 16 may have system-level access, for example, allowing the operator to configure authorized services for subscribers.

In some examples, any of operator 16, client 17, and applications 18 may access the REST interface 22 by way of a service provider system (not shown) implemented and operated by the service provider that manages service provider network 12. In such examples, customers of the service provider may interact with the service provider system using a client device (not shown). For instance, service provider system may include a web server or other application server that provides a portal that includes a graphical user interface (GUI) and/or application programming interface (API), which allow customers to set up subscriber profiles, request services for subscribers, and so forth. In some examples, the service provider system may be owned, operated, and/or maintained by the customer rather than the service provider that manages service provider network 12. In such examples, the service provider system exchanges application data with REST interface 22 to invoke REST methods and receive responses, which the service provider system may present or forward to the entity using the system.

REST interface 22 may map Uniform Resource Identifiers (URIs) to subscriber management-related constructs managed by controller 20 including AAA server 14. The subscriber management constructs may include subscriber profiles (including authorized services) for subscriber devices 6 stored by subscriber database 24 as well as services and SLA profiles defined and stored by services database 26, for example. REST interface 22 organizes the resource URIs according to a subscriber management resource model, which controller 20 translates to the low-level data model recognized by AAA server 14 and NAS 10 and used to manage subscriber devices 6 and configure services in NAS 10. Each of subscriber database 24 and services database 26 may represent an internal or external database, a flat or structured file, or other suitable data structure for storing representations of subscribers information (in the case of subscriber database 24) and of services and SLA profiles (in the case of services database 26).

Network operator 16 and applications 18, for instance, may invoke a method of the REST interface 22 of controller 20 using a communication protocol for transferring application data that specifies the method, a resource URI according to the subscriber management resource model, and optionally parameters for the method. Controller 20 translates the resource URI and the optional parameters to subscriber-management related constructs and applies, to the corresponding resource(s), one of a create, read, update, and delete (CRUD) action corresponding to the method specified by the application data.

In the example of FIG. 1, one of operator 16 or applications 18 invokes a method of the REST interface 22 to apply an action to a subscriber device 6A associated with a subscriber identified by a URI. REST interface 22, if needed according to the action, accesses the subscriber profile for the subscriber in subscriber database 24. For example, invocation of a REST interface 22 method corresponding to a read action may cause the REST interface 22 to return subscriber information for a subscriber identified by a resource URI. As another example, invocation of a REST interface 22 method corresponding to a create action may cause the REST interface 22 to create a new subscriber in the subscriber database 24 using subscriber information included in the application data specifying the method. Moreover, if the subscriber is already 'online' in that the subscriber device 6A has an active service session with NAS 10, REST interface 22 may direct AAA server 14 according to the action to modify the active service session in NAS 10. AAA server 14 may, in response, send a service session modification message 25 to NAS 10 to modify the active service session. The service session modification message 25 may conform to a AAA protocol and may represent a RADIUS Change-Of-Authorization (CoA) or Diameter Re-Auth-Request (RAR) message, for instance.

Further in the example of FIG. 1, one of operator 16 or applications 18 may invoke a method of the REST interface 22 to apply an action to a service or SLA profile 13 for services 11, as stored to services database 26 and configured in NAS 10, and as identified by a resource URI according to the subscriber management resource model described herein. Operator 16 or applications 18 may invoke the method by transferring application data to controller 20 via a communication protocol. Hypertext Transfer Protocol (HTTP) may be used as the application-layer protocol underlying REST interface 22 for transferring application-layer data ("application data"), but the techniques are not limited to HTTP. Upon invocation of the method, REST interface 22, if needed according to the action, modifies the service or SLA profile in the services database 26. Controller 20, in response and according to the action, may send a service modification message 23 to NAS 10 to modify a configuration of any of services 11 or SLA profiles 13 in NAS 10, for instance. Service modification message 23 may conform to a configuration protocol for NAS 10, such as a CLI or SNMP.

The techniques may provide one or more advantages. For example, the REST interface 22 to AAA server 14 may enable operator 16, client 17, and/or applications 18 to use a software-defined networking interface to flexibly and responsively perform subscriber management for the service provider network 12. As a result, any of these entities may embed subscriber management into a software-defined networking (SDN) workflow managed by controller 20 without the operator 16 having to modify at least some of the legacy network infrastructure, such as NAS 10, which may operate according to a legacy AAA framework (e.g., RADIUS/Diameter).

Figure 2:
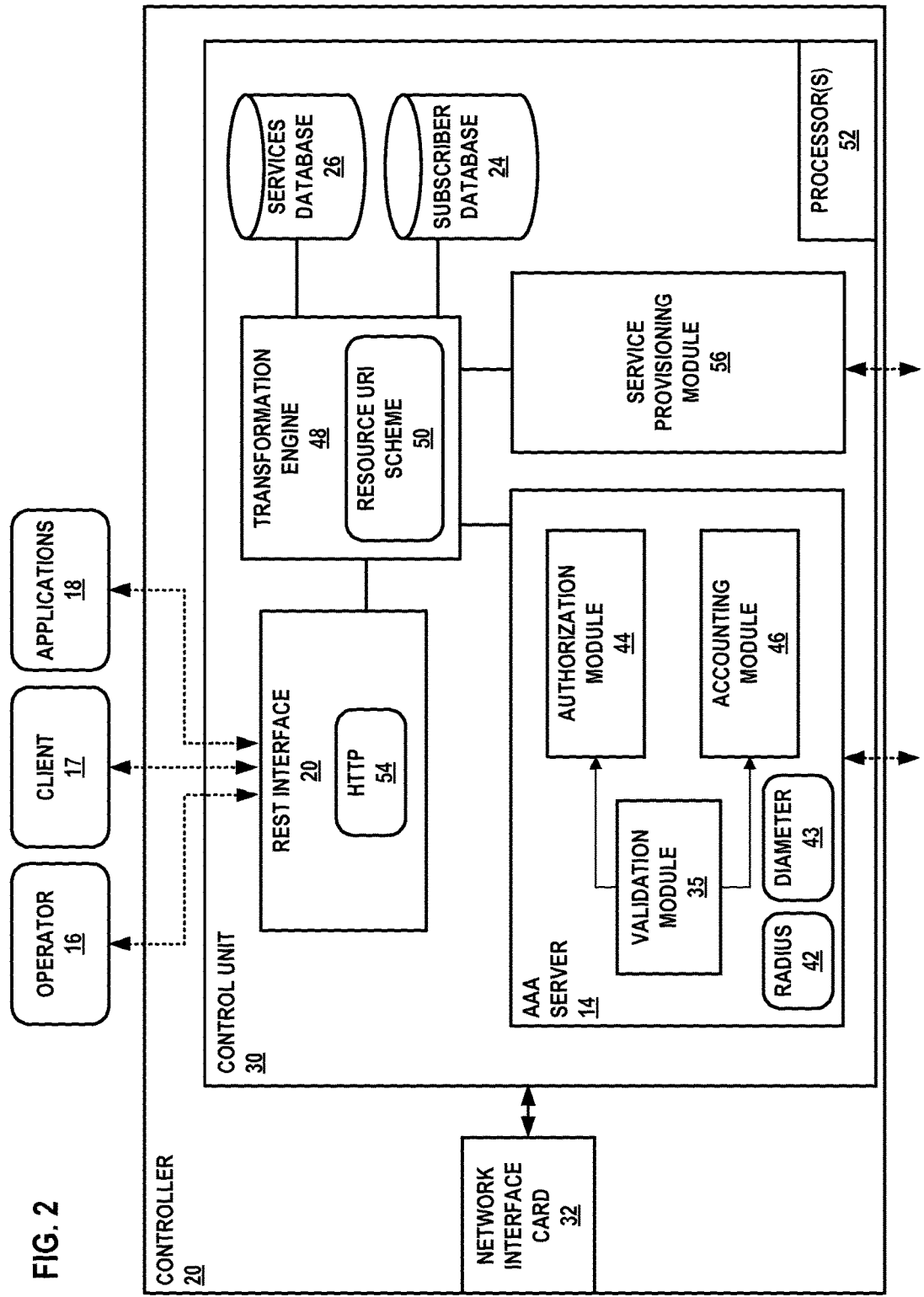
FIG. 2 is a block diagram that illustrating, in detail, an example controller according to techniques described in this disclosure.

FIG. 2 is a block diagram that illustrating, in detail, an example controller according to techniques described in this disclosure. In this example, controller 20 includes network interface 32 coupled to control unit 30. Operations of controller 20 are described in the context of network system 2 of FIG. 1.

Control unit 30 of controller 20 provides an operating environment for executing modules, which in the illustrated example include REST interface 20, transformation engine 48, and AAA server 14. Control unit 30 may include one or more processors 52, including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement functionality described herein. In this example, control unit 30 also includes computer-readable storage media to store services database 26 and subscriber database 24 data structures, which may include flat files, databases, tables, trees, and/or lists, for example. One or more network interface cards 32 of controller 20 exchange packets with devices of network system 2 for processing by control unit 30.

REST interface 20 in this example executes HTTP 54 to receive application data that invokes methods of REST interface 20 and to send application data that is responsive to method invocations. In this respect, REST interface 20 may represent a web services interface for a web service framework for accessing and manipulating the subscriber management resource model described herein. "Methods" may alternatively be referred to as "requests." HTTP 54 being used as the application protocol in this example, the methods are HTTP methods that describe to REST interface 20 the CRUD actions to be performed with respect to a resource URI of the subscriber management resource model described herein. These methods are listed and described in Table 1.

TABLE 1

HTTP Methods

| Method | Action |
|---|---|
| GET | Return information about a specific subscriber management resource. |
| POST | Create new resource or add information about a specific subscriber management resource. |
| PUT | Update information about a specific subscriber management resource. |
| DELETE | Remove a specific subscriber management resource. |

REST interface 20 may expose hierarchically-arranged resource URIs to identify resources. However, REST interface 20 may in some cases use non-URI-based resource identifiers to identify resources. An example structure for resources according to a subscriber management resource model described herein is provided as follows in an informal representation of a JavaScript Object Notation (JSON) format, a light-weight data interchange format, with nested document being supported. This example structure is illustrative and does not imply any specific choice for a type of data storage of subscriber database 24 and services database 26. Moreover, the types of resources described herein may not be exhaustive for any particular implementation of a subscriber management resource model as described herein.

```
/subscribers: // All subscriber resources, each subscriber described as:
{
    Subscriber name: string,
    Services: [ ] array of services, // references to authorized services
    Customer sites (nested document): {
        Site name: Site info,
        ...
    }
    Data Filters (nested document): { // Data filter (policy routing filter)
        Data filter ID: number,
        Data filter rules: [...],
        ...
    }
    ...
}
/services: // all service resources, each service described as:
{
    Service name: service-name, // name or ID for the service
    Service information:
    {
        Service type: string,
        SLA-profile-id: number,
        ...
    }
}
/SLA-profiles: // All SLA Profile resources, each SLA Profile described as:
{
    SLA-profile-id: number,
    SLAs: {
        Rate: number,
        QoS class of service id: number,
        ...
    }
}
```

REST interface 20 may receive application data that invokes methods of the interface and includes JSON-formatted or other data interchanged formatted document as parameters for the methods. For example, JSON-formatted data describing a subscriber may be included in application data from a client of REST interface 20, the application data identifying a resource URI for a subscriber (e.g., "subscriber-A") and specifying a POST method to direct controller 20 to create the new subscriber according to the descriptive data in the JSON-formatted data. JSON is merely one example of a data interchange format. Other formats, such as XML, may be used to exchange application data with REST interface 20.

Any of the REST interface 20 methods listed in Table 1 may apply to a resource identified by a resource URI according to the JSON format above, and may include parameter data for the resource. Example resource URIs for subscribers according to the subscriber management resource model exposed by REST interface 22 according to the JSON format above, along with the action performed by any of the methods listed in Table 1 are listed and described in Table 2.

TABLE 2

Subscriber resources and HTTP methods

| Method | Resource | Action |
|---|---|---|
| GET | /subscribers | Return all existing subscribers. |
| GET | /subscribers/subscriber-A | Return information for subscriber-A in subscribers. |
| POST | /subscribers/subscriber-A | Add subscriber-A to subscribers. Trigger user creation in RADIUS/Diameter. |
| PUT | /subscribers/subscriber-A | Update subscriber-A. Changes of services and data filters applied using RADIUS CoA or Diameter RAR. |
| DELETE | /subscribers/subscriber-A | Remove subscriber-A from subscribers. |

Example resource URIs for services according to the subscriber management resource model exposed by REST interface 22 according to the JSON format above, along with the action performed by any of the methods listed in Table 1 are listed and described in Table 3.

TABLE 3

Service resources and HTTP methods

| Method | Resource | Action |
|---|---|---|
| GET | /services | Return all existing services. |
| GET | /services/service-A | Return information for service-A in services. |

TABLE 3-continued

Service resources and HTTP methods

| Method | Resource | Action |
|---|---|---|
| POST | /services/service-A | Add service-A to services. |
| PUT | /services/service-A | Update service-A. |
| DELETE | /services/service-A | Remove service-A from services. |

Example resource URIs for SLA profiles according to the subscriber management resource model exposed by REST interface 22 according to the JSON format above, along with the action performed by any of the methods listed in Table 1 are listed and described in Table 4.

TABLE 4

SLA profile resources and HTTP methods

| Method | Resource | Action |
|---|---|---|
| GET | /SLA-pro files | Return all existing SLA-profiles. |
| GET | /SLA-profiles/SLA-profile-A | Return information for SLA-pro file-A in SLA-profiles. |
| POST | /SLA-profiles/SLA-profiles-A | Add SLA-profile-A to SLA-profiles. |
| PUT | /SLA-profiles/SLA-profile-A | Update SLA-profile-A. |
| DELETE | /SLA-profiles/SLA-profile-A | Remove SLA-profile-A from SLA-profiles. |

Other resources that may be included in a subscriber management resource model, such as data filters, may be modified using HTTP methods in a manner similar to that applied to SLA profiles, for instance.

In this example implementation, transformation engine 48 transforms resources provided in a high-level subscriber management resource model, according to a resource URI scheme 50, to lower-level objects in a technology data model usable by AAA server 14 and services provisioning module 56 to conform the state of NAS 10 to the description received by REST interface 22. For any resource specified as part of a method invocation, services database 26 and subscriber database 24 may store an update to the resource. For example, a PUT method for /subscribers/subscriber-A may cause an update to the subscriber record for subscriber-A in subscriber database 24. In some examples, transformation engine 48 may translate the PUT method to a SQL UPDATE query for the subscriber record for subscriber-A and execute the query against subscriber database 24. A similar transformation mapping for the remaining HTTP methods is as follows: GET:SELECT, POST:INSERT, and DELETE:DELETE. As another example, invocation of a POST method for /services/service-A may cause REST interface 20 to create a service record for service-A in services database 26, the service record describing service-A according to the document description received in application data that also included the invocation.

AAA server 14 includes validation module 35, authorization module 44, and accounting module 46 to perform AAA functionality for subscriber management. In this example, AAA server 14 communicates with one or more AAA clients using RADIUS 42 and/or Diameter 43. Network interface card 32 exchanges network packets that carry RADIUS protocol messages with a NAS 10 connected to network interface card 32 by at least one network link. User Datagram Protocol (UDP) datagrams carry RADIUS protocol messages. Control unit 30 implements a network stack to receive UDP messages sent to a port assigned to RADIUS and provides application data in the form of RADIUS protocol request packets to authorization module 44 and accounting module 46 for processing after threshold validation of the RADIUS protocol messages by validation module 35. Similarly, control unit 30 uses the network stack to encapsulate RADIUS reply packets in UDP datagrams for output by network interface card 32 to NAS 10.

Authorization module 44 and accounting module 46 implement lower-level subscriber management-related constructs manageable by RADIUS 42 or Diameter 43. For example, subscriber database 24 stores subscriber profiles for subscriber authorized to access network services. On receipt a message that conforms to a AAA protocol and includes a request for a service, authorization module 44 may query subscriber database 24 to determine whether the subscriber is authorized, and to provide an indication of the determination to the AAA client. This indication may include a service activation attribute, which may be a vendor-specific attribute (VSA), that identifies the one or more services In some cases, and as described in further detail with respect to FIG. 4, authorization module 44 dynamically modifies a service authorization for a subscriber in response to an invocation of a REST interface 20 method that modifies the authorized services for a subscriber that is already logged in, i.e., has an active service session.

Service provisioning module 56 executes a protocol or interface to configure services 11 and SLA profiles 13 of NAS 10 to conform services at NAS 10 to the services database 26.

REST interface 20 replies to invoked methods with an HTTP response in accordance with HTTP 54. For some methods, such as GET, the HTTP response includes application data having a document description for the resource(s) identified in the GET request. HTTP Responses include an HTTP status code such as "200 OK" for a GET request, or a "201 Created" for a successfully executed POST request. An HTTP response to a failed request may include one of the Error 4xx, 5xx codes. More specifically, because RADIUS 42 and Diameter 43 are transaction based, REST interface 22 uses HTTP error codes to inform the operator 16, client 17, or application 18 regarding the failure condition. The following are example HTTP error codes that may be used by REST interface 22 to indicate certain of the failure conditions:

400 (Bad Request). Request cannot be fulfilled due to syntax error.

401 (Unauthorized). Similar to 403 Forbidden, but specifically for use when authentication is required and has failed or has not yet been provided.

403 (Forbidden). Identified subscriber is not authorized to have the identified service.

500 (Internal server error). Permanent failure of the service.

503 (Service unavailable). A temporary failure to be alleviated after some delay. For example, controller 20 may be temporarily overloaded.

Figure 3:
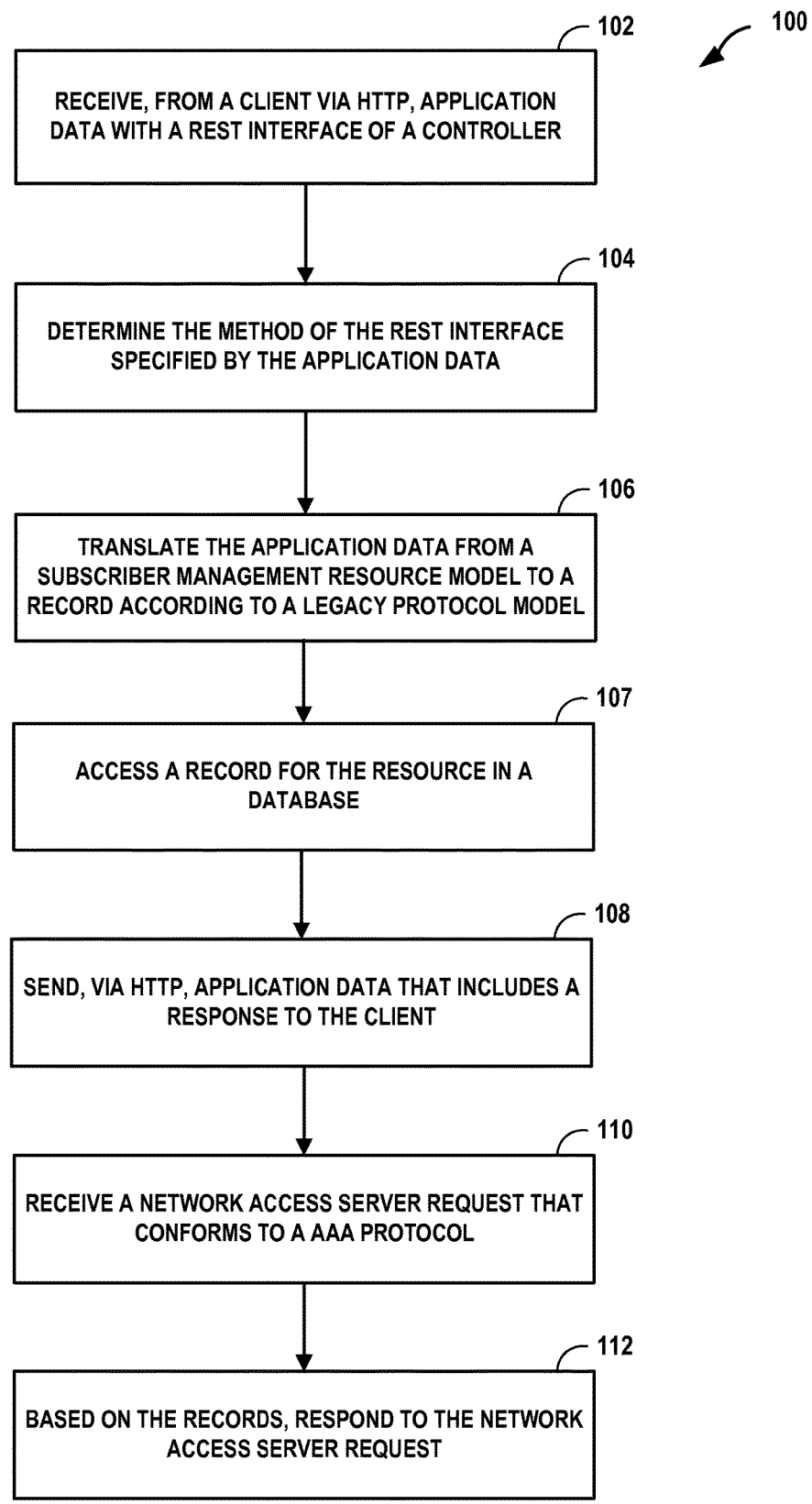
FIG. 3 is a flowchart illustrating an example mode of operation for a controller according to techniques described in this disclosure.

FIG. 3 is a flowchart illustrating an example mode of operation for a controller according to techniques described in this disclosure. The example mode of operation 100 is described with respect to any of the example controllers 20 of FIGS. 1-2.

REST interface 22 of controller 20 receives application data, in a HTTP session, from an HTTP client that is one of an operator 16, client 17, or applications 18 (102). The application data specifies an HTTP method and a resource URI according to a subscriber management resource model, as described in this disclosure. REST interface 22 determines the HTTP method specified by the application data (e.g., GET, POST, PUT, DELETE) (104) and translates the application data from the subscriber management resource model to a record that conforms to a legacy protocol model (106), such as RADIUS/Diameter or a service configuration record for a network access server. REST interface 22 may access a record in a database that corresponds to the resource URI specified in the application data (107). For example, REST interface 22 may retrieve and return a record in response to a GET method, create a new record in response to a POST method, update an existing record in response to a PUT method, and delete an existing record in response to a DELETE method.

REST interface 22 sends application data to the HTTP client via the HTTP session, the application data including an HTTP status code indicating a result of the invoked method (108). Subsequently, AAA server 14 receives a request from NAS 10 conforming to the AAA protocol (110). The request may represent an Access-Request, for instance. AAA server 14 looks up the record and responds to the request with record data (112). For example, the record data may include authorized services for a subscriber identified in an Access-Request message. AAA server 14 may return an indication of the authorized services in an Access-Accept message.

Figure 4:
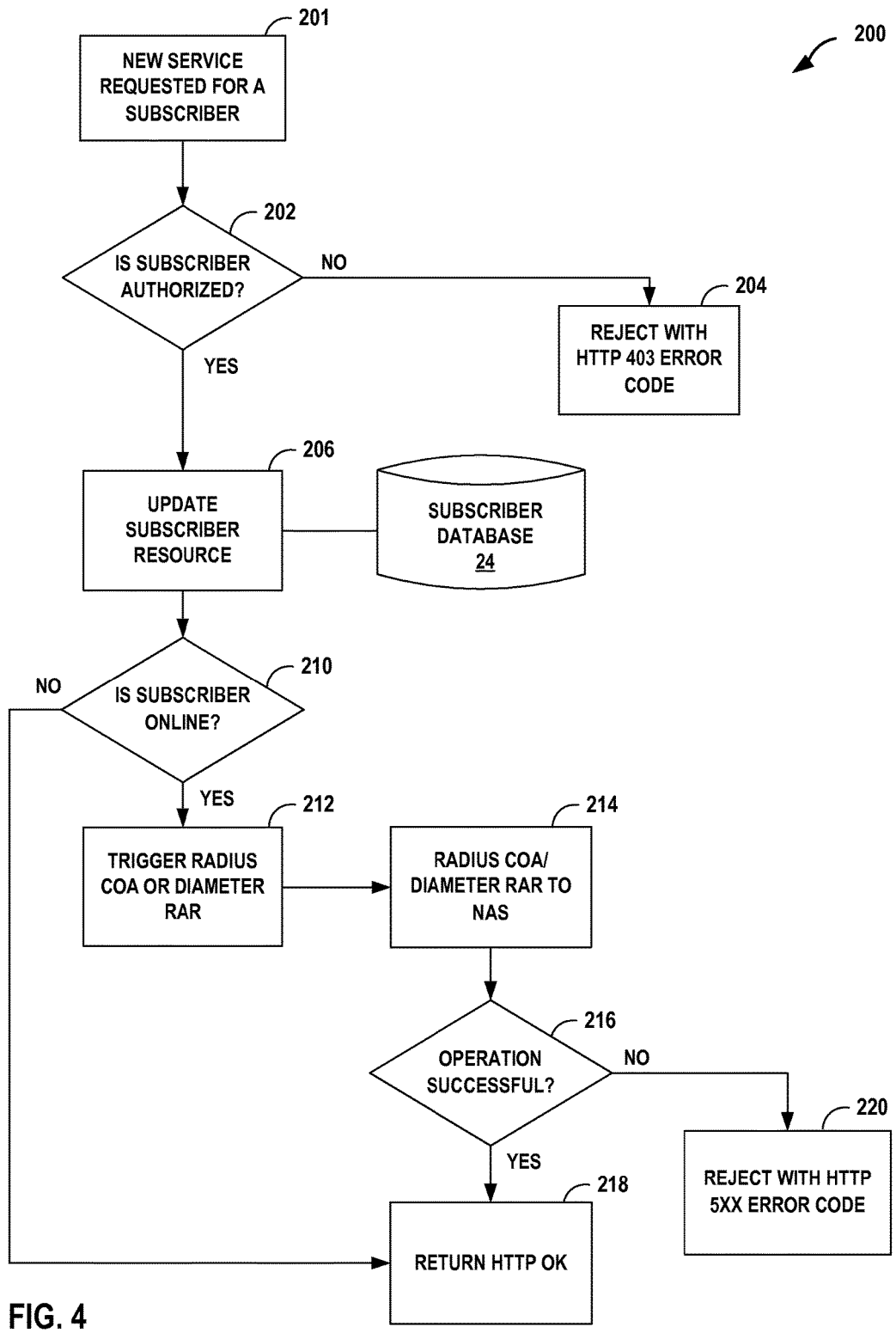
FIG. 4 is a flowchart illustrating an example mode of operation for a controller according to techniques described in this disclosure.

FIG. 4 is a flowchart illustrating an example mode of operation for a controller according to techniques described in this disclosure. The example mode of operation 200 is described with respect to any of the example controllers 20 of FIGS. 1-2.

REST interface 22 receives an HTTP request for a new service for a subscriber (201). If the subscriber is not authorized to have the new service (NO branch of 202), REST interface 22 issues an HTTP response with HTTP code 403 ("Forbidden") to indicate to the HTTP client that the subscriber is not authorized (204). For example, the service may not be included in the subscriber's service plan purchased from the service provider.

If the subscriber is authorized to have the new service (YES branch of 202), REST interface 22 updates a subscriber database 24 record for the subscriber to indicate the subscriber's session should be activated with the new service (206). If the subscriber is not online (i.e., does not have an active session on NAS 10) (NO branch of 210), REST interface 22 issues an HTTP response with HTTP code 200 ("OK") to indicate to the HTTP client that the requested service has been successfully added to the subscriber's profile (218).

If the subscriber is already online (YES branch of 210), REST interface 22 dynamically modifies the subscriber's active session on NAS 10 by triggering a RADIUS Change-of-Authorization (CoA) request or a Diameter Re-Auth-Request (RAR) request by AAA server 14 (212). The request specifies the new service for the subscriber, for instance within a Service-Activation attribute for the request. AAA server 14 of controller 20 sends the request to NAS 10 (which may represent a Broadband Network Gateway, for instance) (214). NAS 10 responds with an indication of the whether NAS 10 successfully executed the request. If the request was successfully executed (YES branch of 216), REST interface 22 issues an HTTP response with HTTP code 200 ("OK") to indicate to the HTTP client that the requested service has been successfully added to the subscriber's active profile (218). Otherwise (NO branch of 216), REST interface 22 issues an HTTP response with an HTTP 5xx error code to indicate there was an error on the NAS 10 to prevent the subscriber's active profile from being dynamically modified (220). By exposing a REST interface 22 to operate in this manner, the controller 20 may enable clients and applications to integrate subscriber management into a dynamic workflow, such as an SDN workflow.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a controller for a service provider network and via a Representational State Transfer (REST) interface, application data that specifies an interface method and a resource identifier for a resource, the resource identifier conforming to a subscriber management resource model;
   determining, by the controller and based on the resource identifier, a record for a subscriber management construct corresponding to the resource, wherein the record is stored by a database for an authentication, authorization, and access (AAA) framework of the service provider network that determines access by subscribers to services of the service provider network;

applying, by the controller to the record, an action corresponding to the interface method to modify the record; and configuring, by a AAA server for the AAA framework and based on the record modified by the controller, the service provider network to modify access by a subscriber to at least one service of the service provider network.

2. The method of claim 1, wherein the record comprises one of a Remote Authentication Dial-In User Service (RADIUS) record and a Diameter record.

3. The method of claim 1, wherein the record is associated with the subscriber and specifies a service authorized for the subscriber, the method further comprising:

receiving, by the AAA server from a network access server of the service provider network, a request message that conforms to a AAA protocol for the AAA framework, the request message requesting authorization for the subscriber; and sending, by the AAA server to the network access server, an accept message that conforms to the AAA protocol, the accept message including an identifier for the service authorized for the subscriber.

4. The method of claim 1, wherein applying the action comprises modifying the record to specify a service authorized for the subscriber, the method further comprising:

sending, by the AAA server to a network access server of the service provider network and in response to modifying the record, a message to modify an active session for the subscriber to include the service authorized for the subscriber.

5. The method of claim 4, wherein the message comprises one of a Remote Authentication Dial-In User Service Change of Authorization message and a Diameter Re-Auth-Request (RAR) message.

6. The method of claim 1, wherein the database comprises a subscriber database, the record comprising one of a Remote Authentication Dial-In User Service record and a Diameter record, wherein the resource identifier for the resource comprises a resource Uniform Resource Identifier (URI) for the resource, and wherein determining the record for the subscriber management construct corresponding to the resource comprises transforming the resource URI for the resource to the record stored by the subscriber database.

7. The method of claim 1, wherein applying an action corresponding to the interface method to modify subscriber access to the service provider network comprises one of creating the record, updating the record, reading the record, and deleting the record.

8. The method of claim 1, wherein receiving the application data comprises receiving, by the controller, the application data via HyperText Transfer Protocol (HTTP), and wherein the interface method comprises one of a GET, POST, PUT, and DELETE HTTP request method.

9. The method of claim 1, wherein the subscriber management resource model comprises hierarchically-arranged resource Uniform Resource Identifiers (URIs) for corresponding subscriber management resources for the service provider network, and wherein the resource comprises one of the subscriber management resources.

10. The method of claim 1, wherein the record for the subscriber management construct corresponding to the resource comprises a database record for one of a subscriber, service, service-level agreement profile, and policy routing filter.

11. The method of claim 1, wherein the record for the subscriber management construct corresponding to the resource comprises a database record that specifies a service definition for a service, the method further comprising:

configuring, by the controller via a configuration protocol, the service definition on a network access server of the service provider network.

12. A method comprising:

sending, by an application to a Representational State Transfer (REST) interface of a controller for a service provider network, first application data that specifies an interface method and a resource identifier for a resource to modify access to the service provider network by a subscriber, the resource identifier conforming to a subscriber management resource model;

determining, by the controller in response to receiving the first application data and based on the resource identifier, a record for a subscriber management construct corresponding to the resource, wherein the record is stored by a database for an authentication, authorization, and access (AAA) framework of the service provider network that determines access by subscribers to services of the service provider network;

applying, by the controller to the record, an action corresponding to the interface method to modify the record;

configuring, by a AAA server for the AAA framework and based on the record modified by the controller, the service provider network to modify access by a subscriber to at least one service of the service provider network; and receiving, by the application from the controller, second application data that indicates a result of the interface method specified by the first application data, the interface method having been executed by the controller.

13. A controller that provides authentication, authorization, and accounting (AAA) services for a service provider network, the controller comprising:

a control unit having one or more processors;

a Representational State Transfer (REST) interface executed by the control unit to receive application data that specifies an interface method and a resource identifier for a resource, the resource identifier conforming to a subscriber management resource model, wherein the REST interface determines, based on the resource identifier, a record for a subscriber management construct corresponding to the resource, wherein the record is stored by a database for a AAA framework to manage the AAA services to determine access by subscribers to services of the service provider network, and wherein the REST interface applies, to the record, an action corresponding to the interface method to modify the record; and a AAA server for the AAA framework and executed by the control unit to configure, based on the record modified by the REST interface, the service provider network to modify access by a subscriber to at least one service of the service provider network.

14. The controller of claim 13, wherein the record comprises one of a Remote Authentication Dial-In User Service (RADIUS) record and a Diameter record.

15. The controller of claim 13, wherein the record is associated with the subscriber and specifies a service authorized for the subscriber,
wherein the AAA server is executed by the control unit to receive, from a network access server, a request message that conforms to a AAA protocol for the AAA framework, the request message requesting authorization for the subscriber,
wherein the AAA server sends, to the network access server, an accept message that conforms to the AAA protocol, the accept message including an identifier for the service authorized for the subscriber.

16. The controller of claim 13,
wherein to apply the action the REST interface modifies the record to specify a service authorized for the subscriber,
wherein the AAA server is executed by the control unit to send, in response to the REST interface modifying the record, a message to modify an active session for the subscriber to include the service authorized for the subscriber.

17. The controller of claim 16, wherein the message comprises one of a Remote Authentication Dial-In User Service Change of Authorization message and a Diameter Re-Auth-Request (RAR) message.

18. The controller of claim 13, further comprising:
a transformation engine executed by the control unit,
wherein the database comprises a subscriber database, the record comprising one of a Remote Authentication Dial-In User Service record and a Diameter record,
wherein the resource identifier for the resource comprises a resource Uniform Resource Identifier (URI) for the resource, and
wherein to determine the record for the subscriber management construct corresponding to the resource the transformation engine transforms the resource URI for the resource to the record stored by the subscriber database.

19. The controller of claim 13,
wherein, to apply an action corresponding to the interface method to modify subscriber access to the network, the REST interface creates the record, updates the record, reads the record, or deletes the record.

20. The controller of claim 13,
wherein, to receive the application data, the REST interface receives the application data via HyperText Transfer Protocol (HTTP), and
wherein the interface method comprises one of a GET, POST, PUT, and DELETE HTTP request method.

21. The controller of claim 13,
wherein the subscriber management resource model comprises hierarchically-arranged resource Uniform Resource Identifiers (URIs) for corresponding subscriber management resources for the service provider network, and
wherein the resource comprises one of the subscriber management resources.

22. The controller of claim 13, wherein the record for the subscriber management construct corresponding to the resource comprises a database record for one of a subscriber, service, service-level agreement profile, and policy routing filter.

23. The controller of claim 13, wherein the record for the subscriber management construct corresponding to the resource comprises a database record that specifies a service definition for a service, the controller further comprising:
a service provisioning module executed by the control unit to configure, via a configuration protocol, the service definition on a network access server of the service provider network.

24. A non-transitory computer-readable medium comprising instructions for causing one or more programmable processors to:
receive, by a controller for a service provider network and via a Representational State Transfer (REST) interface, application data that specifies an interface method and a resource identifier for a resource, the resource identifier conforming to a subscriber management resource model;
determine, by the controller and based on the resource identifier, a record for a subscriber management construct corresponding to the resource, wherein the record is stored by a database for an authentication, authorization, and access (AAA) framework of the service provider network that determines access by subscribers to services of the service provider network;
apply, by the controller to the record, an action corresponding to the interface method to modify the record; and
configure, by a AAA server of the controller for the AAA framework and based on the record modified by the controller, the service provider network to modify access by a subscriber to at least one service of the service provider network.

* * * * *